E. MORGAN.
HARROW TRUCK.
APPLICATION FILED AUG. 26, 1913.
1,128,711.
Patented Feb. 16, 1915.
2 SHEETS—SHEET 1.
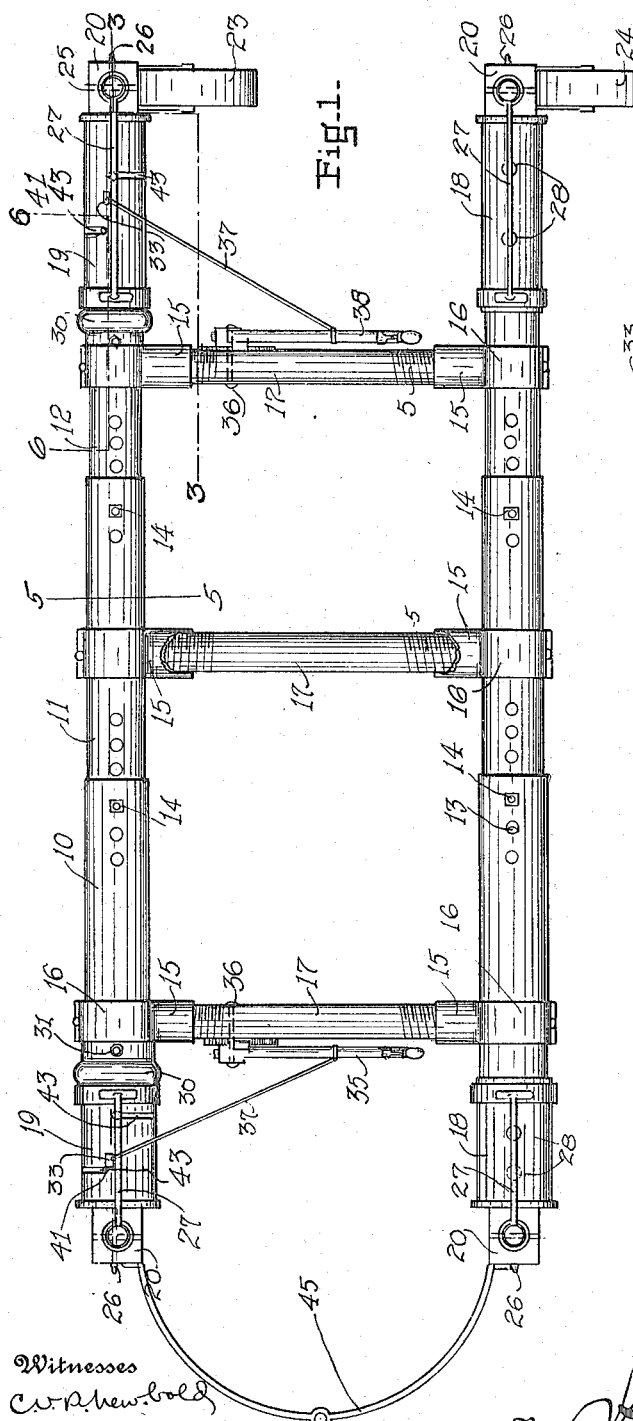
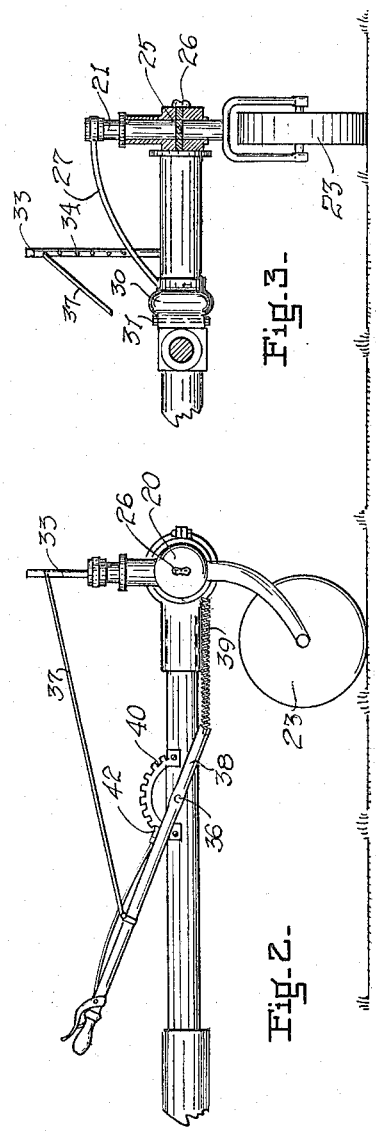
Witnesses
C. W. Rhewbold
E. H. Foster
Inventor
Eldon Morgan
By
Attorney

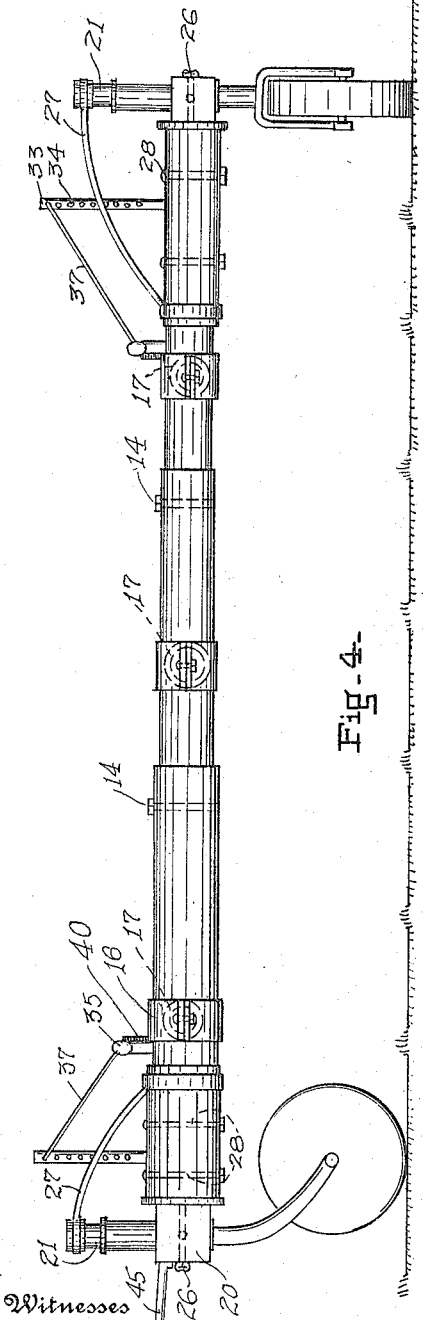

UNITED STATES PATENT OFFICE.

ELDON MORGAN, OF HOLSTEIN, IOWA.

HARROW-TRUCK.

1,128,711.

Specification of Letters Patent.

Patented Feb. 16, 1915.

Application filed August 26, 1913. Serial No. 786,738.

*To all whom it may concern:*

Be it known that I, ELDON MORGAN, a citizen of the United States, residing at Holstein, in the county of Ida and State of Iowa, have invented certain new and useful Improvements in Harrow-Trucks; and I do hereby declare the following to be a full, clear, and exact description of the invention, such as will enable others skilled in the art to which it appertains to make and use the same.

This invention comprehends improvements in harrow trucks and relates more particularly to those of the type which is especially adapted for conveying a toothed or truck harrow to and from the field which is to be cultivated.

One of the objects of the invention resides in the provision of a harrow truck of this nature which shall be of extremely simple construction, strong, durable, and very practical.

Another object of the invention resides in the provision of a harrow truck having an adjustable frame supported upon wheels, and means whereby one side of the frame may be raised and lowered to facilitate the loading and unloading of harrows.

With these and other objects in view, as will become more apparent as the description proceeds, the invention consists in certain novel features of construction, combination, and arrangement of parts, as will be hereinafter described and claimed.

For a complete understanding of the invention, reference is to be had to the following description and accompanying drawings in which, Figure 1 is a top plan view of my improved harrow truck, Fig. 2 is a fragmentary end elevation, Fig. 3 is a section taken on the plane of line 3—3 of Fig. 1, Fig. 4 is a side elevation, Fig. 5 is a fragmentary view taken on the plane of line 5—5 of Fig. 1, Fig. 6 is a section taken on the plane of line 6—6 of Fig. 1, and, Fig. 7 is an end elevation, showing the truck in position to receive a harrow.

Generally speaking, my improved truck comprises an adjustable frame, supporting wheels journaled to rotatable standards carried by the frame, and means for raising and lowering the right side of the frame. The frames includes parallel side bars formed by telescoping sections 10, 11 and 12. The rear sections 12 telescope within the intermediate sections 11 and these last sections telescope in the forward sections 10. The sections are formed with series of alined openings 13 to receive locking bolts 14 which hold the sections in their adjusted positions. Internally threaded sockets 15 formed upon clamps 16, are secured to the side bars of the frame and receive the extremities of the cross bars 17. These cross bars are positively threaded adjacent their ends for reception within the sockets and it will be apparent that the width of the frame may be varied by threading the cross bars into or out of the sockets. The telescoping sections forming the side bars and the cross pieces 17 are preferably made tubular so as to make the frame as light as possible. The ends of the side bars, however, are solid, as shown in Fig. 6, and have sleeves 18 and 19 positioned thereon. These sleeves have formed upon their outer ends the bearings or journal boxes 20 through which the rotatable standards 21 extend. These standards are forked and curved at their lower ends, as shown in the drawings, and have attached thereto the wheels 23 and 24, the wheels 23 being upon the right side of the truck and the wheels 24 being upon the left side. Each standard is formed with a pair of transverse openings 25 which extend at right angles to each other. Locking pins 26 are adapted to be inserted through the journal boxes into these openings so as to lock the standards against rotation when desired. Braces 27 are attached to the upper ends of the standards and to the side bars and serve to greatly reinforce the standards.

The sleeves 18 are rigidly secured to the left side bar of the frame by bolts 28 but the sleeves 19 upon the right side bar are rotatively mounted. As shown in Fig. 6, these last mentioned sleeves are formed with the annular flanges 29 upon their inner extremities and these flanges coöperate with locking members 30 to hold the sleeves against longitudinal movement but permit a rotational movement. The members 30 are rigidly secured to the side bars by bolts 31 and are provided with annular concave portions 32 which overlap the flanges 29.

To provide for rotating the sleeves 19 in order that the right side of the truck may be raised or lowered, I form upon each of the sleeves a laterally extending arm 33 which is formed with a longitudinal series of openings 34. A lever 35 is pivotally secured to the front and rear cross bars 17 by means of pivot members 36. The pivot members extend longitudinally of the frame and pass through the levers intermediate the ends thereof. Connecting rods 37 are secured at their ends to the arms 33 and to the levers 35 between the pivot points and the handles. The lower ends of the levers indicated by the numeral 38, are connected by contractile springs 39 to the side bars of the frame. Toothed quadrants 40 are provided to coöperate with the latches 42 carried by the levers so as to lock the latter in any desired position. The sleeves 19 are formed with circumferential slots 43 which coöperate with the threaded pins 41 so as to permit of the sleeves being rotated 180°.

To move the truck from place to place, double or swingle trees to which horses or a horse are connected, may be secured to the rod 45, which is attached to the forward journal boxes 20 in any suitable manner. When the truck is being drawn in this fashion, the forward standards 21 may be left free to rotate in order that the truck may easily be guided and the rear standards may be locked in such position that the wheel carried thereby will be disposed in the longitudinal planes of the side bars. When it is desired to load a harrow upon the truck, said harrow is first stood on edge and the truck pushed against one side thereof. Then by swinging the handles of the levers 35 upwardly, the sleeves 19 will be rotated so as to cause the right side of the truck to lower, as shown in Fig. 7. It will be understood that before the truck is lowered, the wheel standards are locked so that the wheels will be disposed in planes extending transversely to the truck. After the truck has been lowered to the position shown in Fig. 7, a harrow is swung onto the same and the truck is then raised to its normal position by swinging the levers 35 into the position shown in Fig. 2. The contractile springs 39 assist in raising the right side of the truck. To unload the harrow from the truck the right side is again dropped into the position shown in Fig. 7, after which the harrow is tilted to a vertical plane and pushed onto the ground.

From the foregoing description taken in connection with the accompanying drawings, it will be apparent that I have provided a very strong, simple, and practical harrow truck which is so constructed as to permit a harrow being easily loaded and unloaded.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, I claim:—

1. A harrow truck comprising a frame having parallel side bars, sleeves positioned upon the ends of said side bars, journal boxes formed upon the outer ends of said sleeves, wheel shafts extending through said journal boxes, wheels secured to the lower ends of said shafts, and means for rotating the sleeves upon one side of the truck to cause said side to be raised or lowered.

2. A harrow truck including a frame having a pair of longitudinal side bars, sleeves positioned upon the extremities of said side bars, journal boxes formed upon the outer ends of said sleeves, wheel standards extending through said journal boxes, means for locking the standards against rotation therein, and means for rotating the sleeves upon one side of the frame, whereby said side may be raised or lowered.

3. In a harrow truck, a frame having a pair of side bars, sleeves positioned upon the extremities of said side bars, journal boxes formed upon the outer ends of said sleeves, wheel standards extending through said journal boxes, the sleeves upon one side of the frame being rotatable, laterally extending arms formed upon said rotatable sleeves, pivoted levers, and means connecting said levers with the arms, whereby the levers may be swung so as to rotate the sleeves and raise and lower one side of the frame.

In testimony whereof I affix my signature in presence of two witnesses.

ELDON MORGAN.

Witnesses:
R. P. WHEATLEY,
ALBERT G. MERKLEY.

Copies of this patent may be obtained for five cents each, by addressing the "Commissioner of Patents, Washington, D. C."